United States Patent
Nagata et al.

(10) Patent No.: US 6,629,643 B1
(45) Date of Patent: Oct. 7, 2003

(54) MAGNETIC CARD TRANSACTION APPARATUS

(75) Inventors: Shigeyuki Nagata, Nagano (JP); Kenji Hirasawa, Nagano (JP); Yoshiharu Uemura, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/611,501

(22) Filed: Jul. 7, 2000

(30) Foreign Application Priority Data

Jul. 9, 1999 (JP) .......................... 11-196700

(51) Int. Cl.[7] .............................................. G06K 13/00
(52) U.S. Cl. ...................................................... 235/475
(58) Field of Search ................................ 235/475, 477, 235/480, 449

(56) References Cited

U.S. PATENT DOCUMENTS

| 4,007,356 A | | 2/1977 | Stucke et al. | |
| 4,259,569 A | * | 3/1981 | Passer et al. | 235/462.04 |
| 4,803,349 A | * | 2/1989 | Sugimoto et al. | 235/475 |
| 4,950,877 A | * | 8/1990 | Kurihara et al. | 235/449 |
| 5,294,785 A | * | 3/1994 | Fukuda et al. | 235/477 |
| 5,850,079 A | * | 12/1998 | Ohwa et al. | 235/475 |
| 6,460,771 B1 | | 10/2002 | May | |

FOREIGN PATENT DOCUMENTS

FR 2 720 851 12/1995

OTHER PUBLICATIONS

English Abstract of FR 2 720 851.
Article: Svigals J, "Unauthorized Card Stripe Reading Inhibitor" IBM Technical Disclosure Bulletin, IBM Corp., New York, US, vol. 26, No. 6, Nov. 1, 1983, p. 2707.

* cited by examiner

Primary Examiner—Michael G. Lee
Assistant Examiner—Lisa M Caputo
(74) Attorney, Agent, or Firm—Reed Smith LLP (57) ABSTRACT

A card with a magnetic stripe when fed into a card reader can be illegally read by a read head unobtrusively attached to the outside of the card reader adjacent to the slot into which the card is fed. To defeat this illegal reading, movement of a card through the read head is interrupted thereby making it difficult for the illegal read head to read the stripe. This interruption occurs at the point where the proper read head inside the card reader is not reading the magnetic stripe. The interruption can be a brief stop or a brief reversal in direction. The interruption occurs once while the card is being fed into the card reader and once when the card is being fed out of the card reader.

11 Claims, 8 Drawing Sheets

MAGNETIC CARD TRANSACTION APPARATUS

BACKGROUND OF THE INVENTION

The present invention relates to a magnetic card transaction apparatus having a magnetic card reader; more specifically, it relates to a magnetic card transaction apparatus having a function to prevent incorrect reading of a magnetic card.

A magnetic card reader is attached to a magnetic card transaction apparatus which performs various transactions using a magnetic card, such as an ATM found in a bank. At a card insertion area of a magnetic card reader, in general, one finds the following in order in the direction of a card to be inserted: a card slot through which a magnetic card is inserted or ejected; a card insertion detector which detects the magnetic card inserted therein; a guiding path which guides the magnetic card inserted from the card slot to the inside of the apparatus; and a shutter which opens and closes the guiding path.

When a user inserts a magnetic card into a card slot, a magnetic strip at the end of the inserted magnetic card is detected by a card insertion detector; then, a shutter is opened such that the magnetic card can be taken in. The inside of the shutter has a pair of card transferring rollers which forms a transferring means for a magnetic card; the inserted magnetic card is held to be taken in by the card transferring rollers.

In order to avoid undesired sensations, such as a sensation of the magnetic card being stuck, from being sensed by an user when a magnetic card is inserted, the shutter is opened while the pair of card transferring rollers are driven as soon as insertion of the magnetic card is detected by the card insertion detector; therefore, the magnetic card can be smoothly taken following insertion of the magnetic card by a user.

On the other hand, the amount of projection of the card from the card slot at the time of ejection is maximized in order for the user to readily remove the card from the card slot.

In a magnetic card reader described above, insertion of a magnetic card is such that the end of the magnetic card is inserted to a card slot then the card is transferred by a pair of card transferring rollers at an even speed. Similarly, ejection of a magnetic card is such that the magnetic card is transferred by the pair of card transferring rollers at a steady speed until the card is actually ejected from the card slot.

Therefore, when a magnetic head is attached to the outside of the card slot (in order to perform an illegal act), the magnetic card is transferred at an even speed along the position for detecting the magnetic head. Consequently, information recorded on the magnetic card can be read out by the magnetic head attached to the outside of the card slot.

The present invention intends to provide a magnetic card transaction apparatus which is configured such that a magnetic card inserted or ejected from a card slot cannot be read out by a magnetic head attached to the outside of the card slot.

BRIEF DESCRIPTION OF DRAWINGS

FIG. 2(*a*) is a flowchart showing an operation of taking in a magnetic card about the apparatus of FIG. 1.

FIG. 2(*b*) is a flowchart showing an operation of ejecting the magnetic card about the apparatus of FIG. 1.

FIG. 3(*a*) is an operation of taking in a magnetic card.

FIG. 3(*b*) is an operation of ejecting the magnetic card.

DESCRIPTION OF THE PREFERRED EMBODIMENTS

The following describes a magnetic card transaction apparatus using the present invention in reference to drawings.

Figure 1:
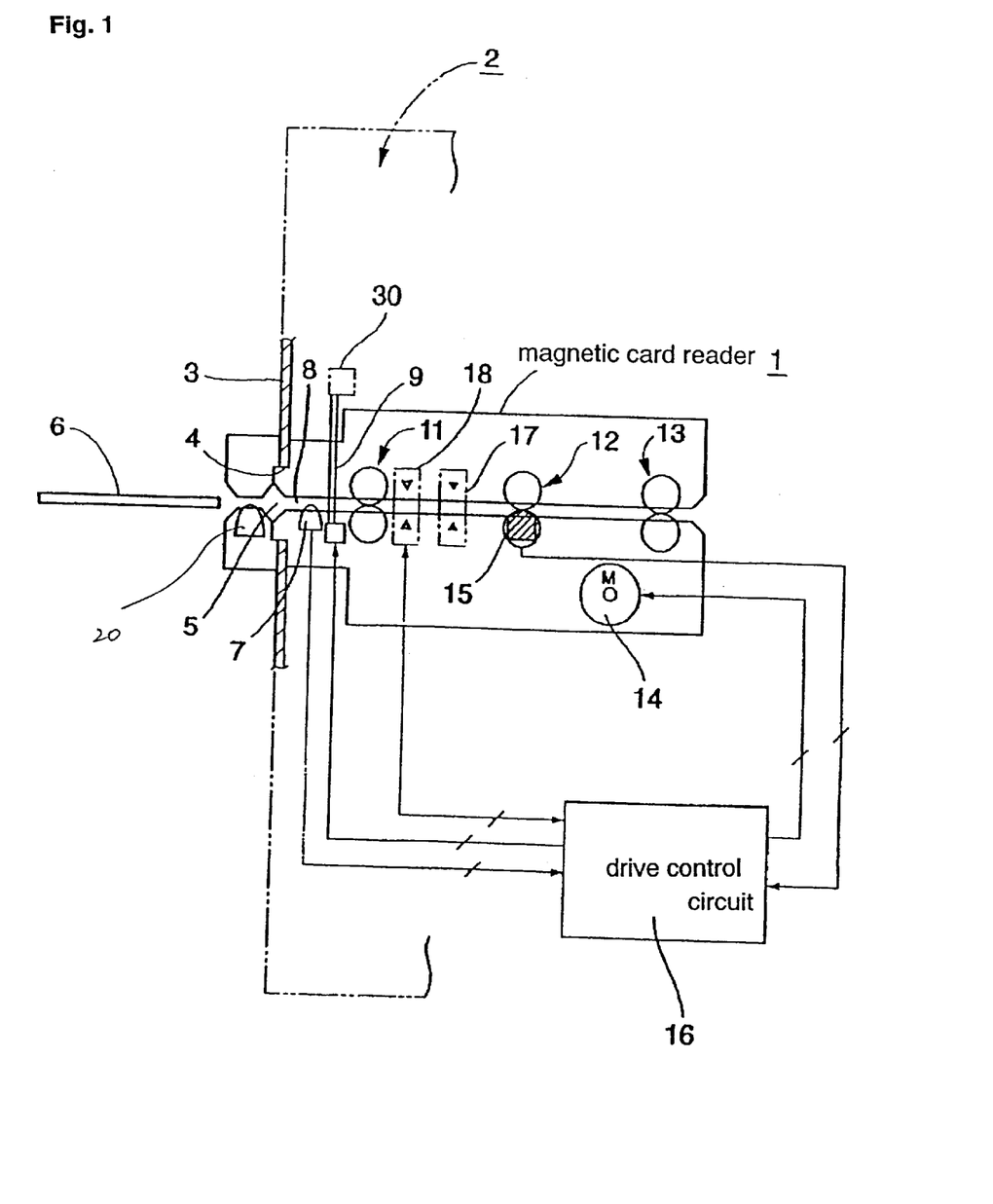
FIG. 1 is a schematic configuration showing major parts of a magnetic card transaction apparatus according to the present invention.

FIG. 1 is a schematic configuration of major parts of a magnetic card reader which is attached to a magnetic card transaction apparatus, such as an ATM. Magnetic card reader 1 of this embodiment is fixed to the back side of card slot opening 4 formed at front panel 3 of magnetic card transaction apparatus 2.

Magnetic card reader 1 comprises: card slot 5 for insertion and ejection of a magnetic card; magnetic head 7 as a card insertion detector which detects magnetic card 6 inserted from card slot 5; guiding path 8 which guides magnetic card 6, inserted from card slot 5, to the inside of the apparatus; and shutter 9 which opens and closes guiding path 8. These parts are placed in the above order in the direction of a card to be inserted.

A pair of card transferring rollers 11 is placed inward of shutter 9. Magnetic card 6 is taken in by rollers 11 and is transferred along a transferring path defined by a plurality of pairs of transferring rollers 12, 13 which are placed with a given distance. The spacing between rollers 11 and 12 is slightly less than the length of the card 6. Likewise, the spacing between rollers 12 and 13 is slightly less than the length of the card 6. Each pair of rollers 11 through 13 are rotated by drive motor 14. Magnetic head 15 is placed at a position of rollers 12 for reading a magnetic strip on magnetic card 6 which passes thereby.

Drive control circuit 16 is to control the drive of each part and is configured of a microcomputer. It controls operations of taking in magnetic card 6 and reading out by magnetic head 15 according to a control program stored in a ROM thereof. Also, photo sensors 17, 18 are to detect positions of magnetic card 6 described later.

Figure 2A:
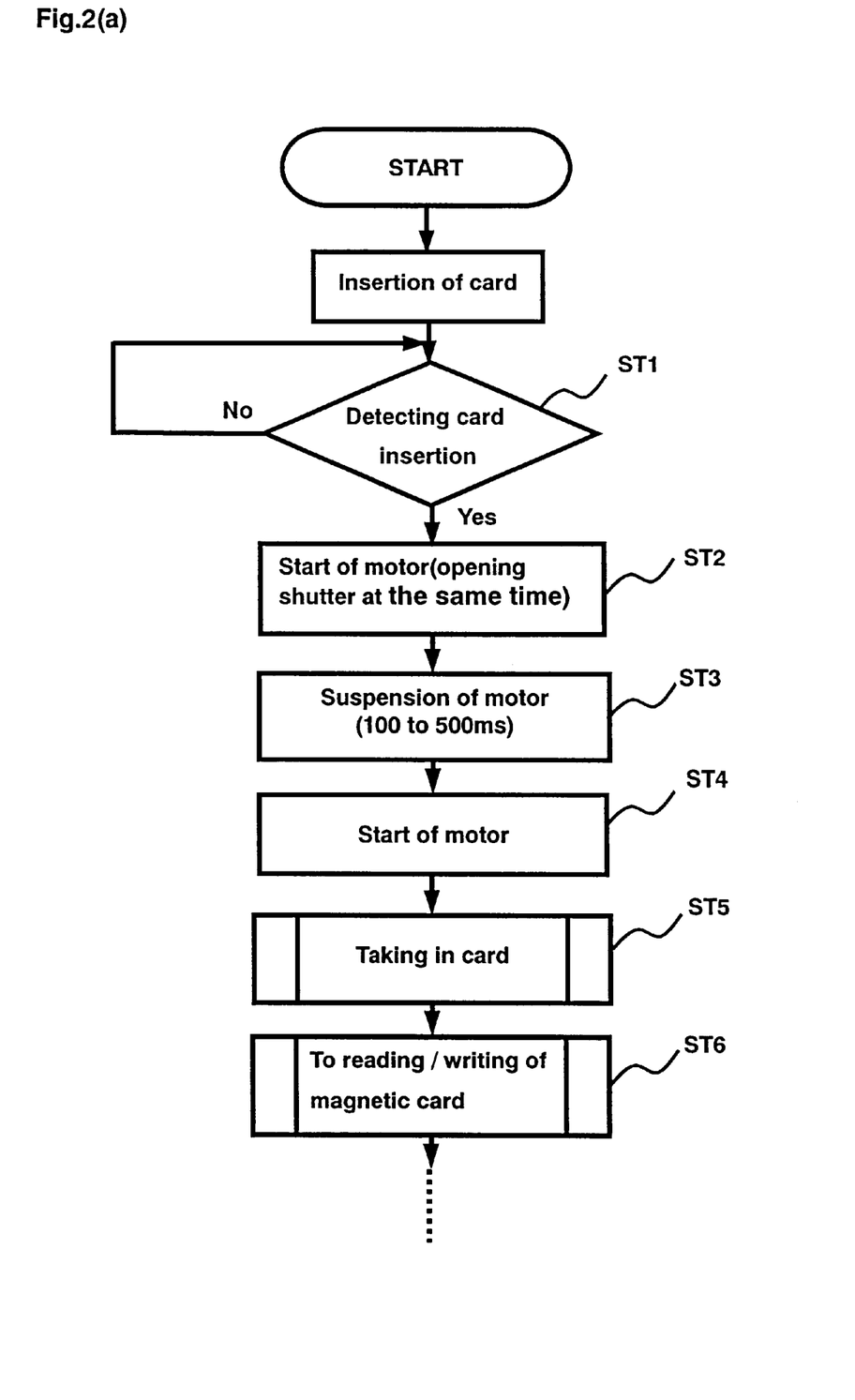
Figure 2B:
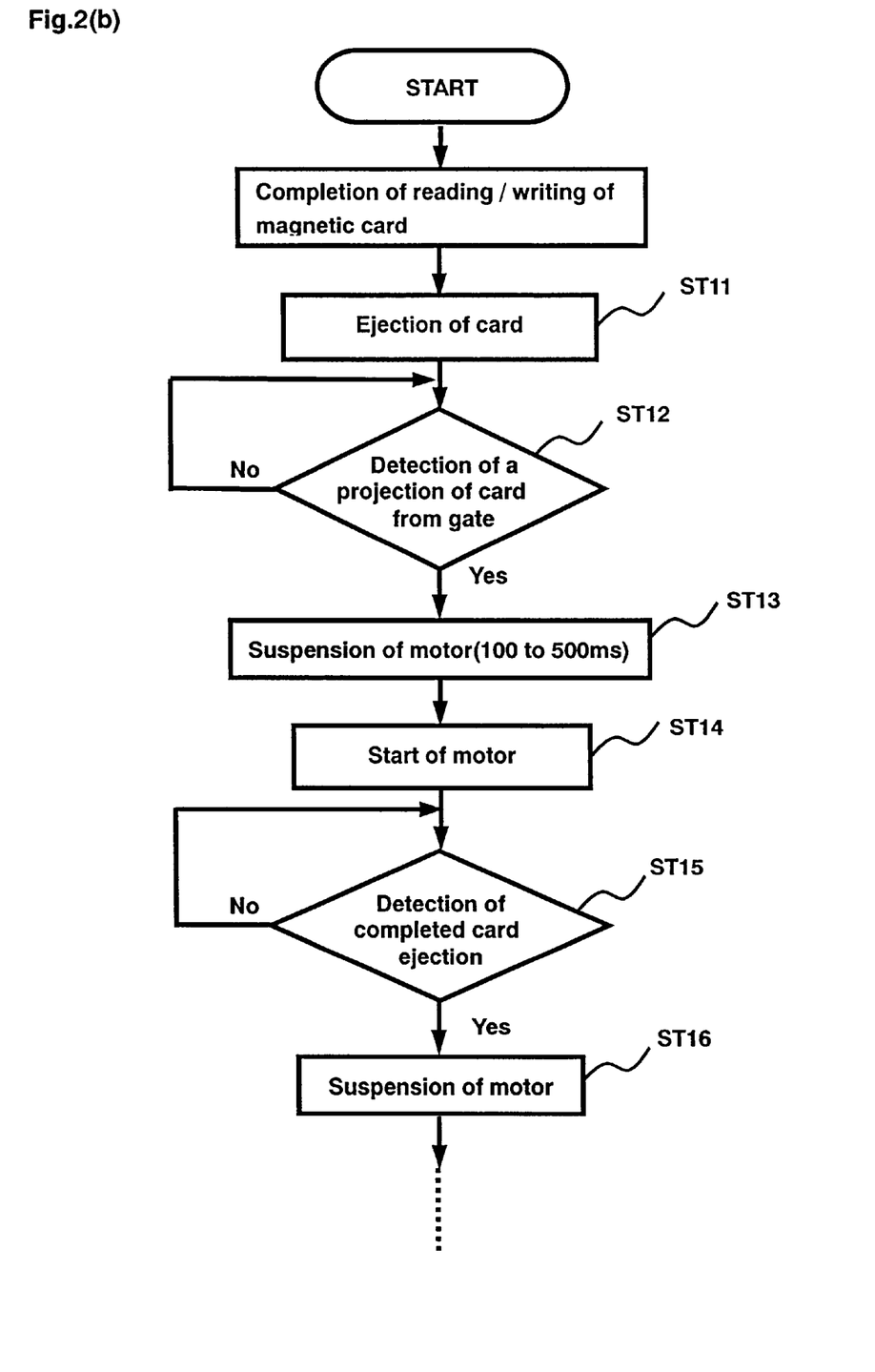
Figure 3:
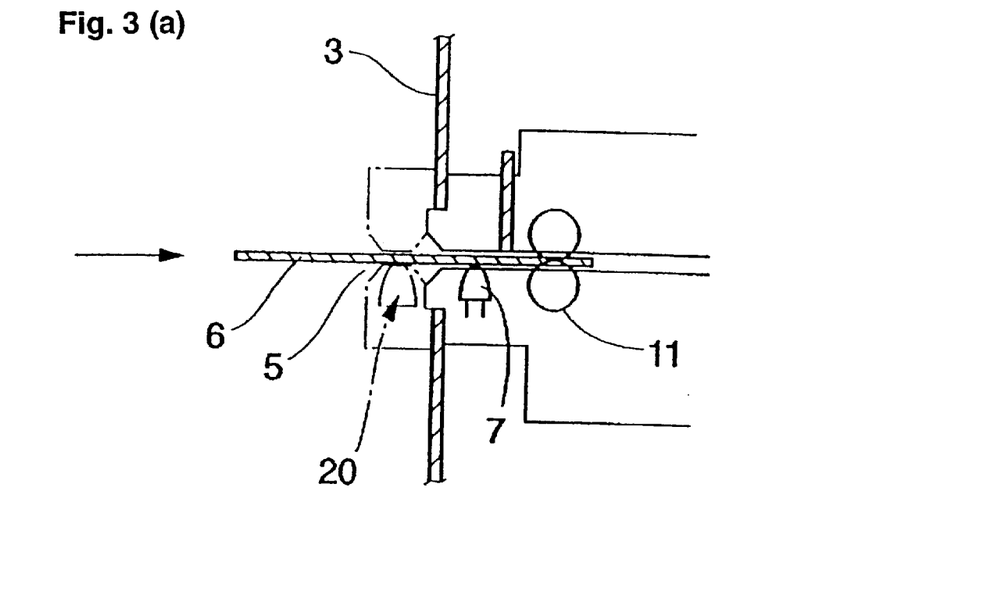

The following describes operations of taking in and ejection of a magnetic card in this embodiment of magnetic card reader 1 in reference to a flowchart in FIG. 2 and a configuration in FIG. 3.

First, the operation of taking in magnetic card 6 is described herein according to a flowchart in FIG. 2(*a*). When a user inserts magnetic card 6 through card slot 5, magnetic head 7 or a sensor (not shown in the figure) detects a magnetic strip formed on inserted magnetic card 6 (ST1). Based on detection signals from magnetic head 7, drive control circuit 16 rotates (starts) motor 14 to drive a transferring system including transferring rollers 11; shutter 9 is opened at the same time (ST2).

As a result, magnetic card 6 can be taken in. When it passes the shutter position while being taken in, the end of the card is engaged by a pair of rollers 11 such that taking in of magnetic card 6 is started.

In this embodiment, when the back end of magnetic card 6 projects from card slot 5 after motor 14 is rotated (started), motor 14 is temporarily suspended to suspend operation of taking in magnetic card 6. Time of suspending motor 14 can be controlled based on a period of time after detection of the card by photo sensors 18. Also, it can be controlled based on a period of time after detection of magnetic head 7 for detecting insertion of a card. Suspension of taking in magnetic card 6 is set to be 100 ms to 500 ms in this embodiment (ST3).

Thereafter, motor 14 is activated (ST4) to restart taking in magnetic card 6. After magnetic card 6 is taken in to the position of magnetic head 15, formed in the card reader (ST5), magnetic head 15 performs reading from or writing onto magnetic card 6 (ST6).

In the operation of taking in magnetic card 6 of this embodiment, the operation is temporarily suspended while the back end of magnetic card 6 projects from card slot 5 and is continued after a given period of time. As a result, if an illegal magnetic head 20 is attached to the outside of card slot 5, such as on the surface of front panel 3, as indicated with an imaginary line in FIG. 3(a), magnetic card 6 is temporarily stopped and therefore that magnetic head 20 cannot completely read out magnetically recorded information of inserted magnetic card 6. Therefore, illegal reading out of magnetically recorded information by magnetic head 20 can be prevented. It should be noted, however, that the apparatus is arranged so that stopping the card in this way to prevent illegal reading thereof does not effect the authorized reading of the card by the magnetic head 15.

The following describes ejection of magnetic card 6 in magnetic card reader 1 of this embodiment in reference to a flowchart of FIG. 2(b). Herein, pairs of rollers 11 through 13 start ejection of magnetic card 6 (ST11). When photo sensor 17 detects the back end of magnetic card 6 in the direction of ejection (ST12), the ejection operation is temporarily suspended (ST13).

As shown in FIG. 3(b), when photo sensor 17 detects the back end of magnetic card 6, the front end of magnetic card in the direction of ejection projects out of card slot 5 by a given amount. Also, suspension of ejection of the card is established to be between 100 ms to 500 ms.

After the period of suspension passes, motor 14 is started to restart ejection of magnetic card 6 (ST14). Thereafter, photo sensor 18, located on the side closer to card slot 5 than photo sensor 17, detects the back end of magnetic card 6 (ST15); then, motor 14 is stopped (ST16). This completes the motorized ejection of the card.

Upon completion of motorized ejection of the card, the back end of magnetic card 6 is still held in rollers 11. As a user lightly pulls magnetic card 6, it can be removed from card slot 5. Also, when the user forgets to remove magnetic card 6, magnetic card 6 can be retrieved to the inside after a given period of time by driving the pair of transferring rollers 11.

In magnetic card reader 1 of this embodiment, when a magnetic card is ejected, the operation of ejection is suspended while the end of the card to be ejected projects from card slot 5. Therefore, even though illegal magnetic head 20 is attached to the front panel as indicated with an imaginary line in FIG. 3(b), the break in motion prevents magnetically recorded information of magnetic card 6 from being read out by magnetic head 20 as the card 6 is being ejected.

According to magnetic card reader 1 of this embodiment, transferring of the card is suspended only once during taking in and once during ejection of the card. However,, one may modify it such that suspension of transferring the card can be repeated twice or more. In other words, one can repeat ST3, ST4 or ST13, ST14 of FIG. 2.

Also, time for suspension of transferring the card is established to be 100 ms to 500 ms in this embodiment. This range of time allows a user to insert a magnetic card without sensing undesired sensations, such as the card being stuck. However, the range of time can be either shorter or longer than the time indicated above.

Further Embodiments

To prevent reading out of magnetic card 6, which is inserted or ejected from card slot 5, by a magnetic head (illegally) attached to the outside of card slot 5, the following operation to control operation of taking in and ejection of magnetic card can be performed.

A first method of control is to temporarily change the movement of magnetic card 6 to the reverse direction during taking in or during ejection of the card. When magnetic card 6 is taken in, a motor is rotated in the reverse direction to temporarily move magnetic card 6 in the reverse direction. Instead of performing ST3(suspending the motor) of FIG. 2(a); then, operation of taking in the card is restarted. This reverse motion can be repeated for a plurality of times.

When magnetic card 6 is ejected, motor 14 is rotated to temporarily change the direction of motion of magnetic card 6 for a given period of time. Instead of performing ST13 (suspending the motor) of FIG. 2(b); then, operation of ejection is restarted. The reversal of motion for a short period of time (e.g. 200 ms) can be repeated for a plurality of times.

Figure 4:
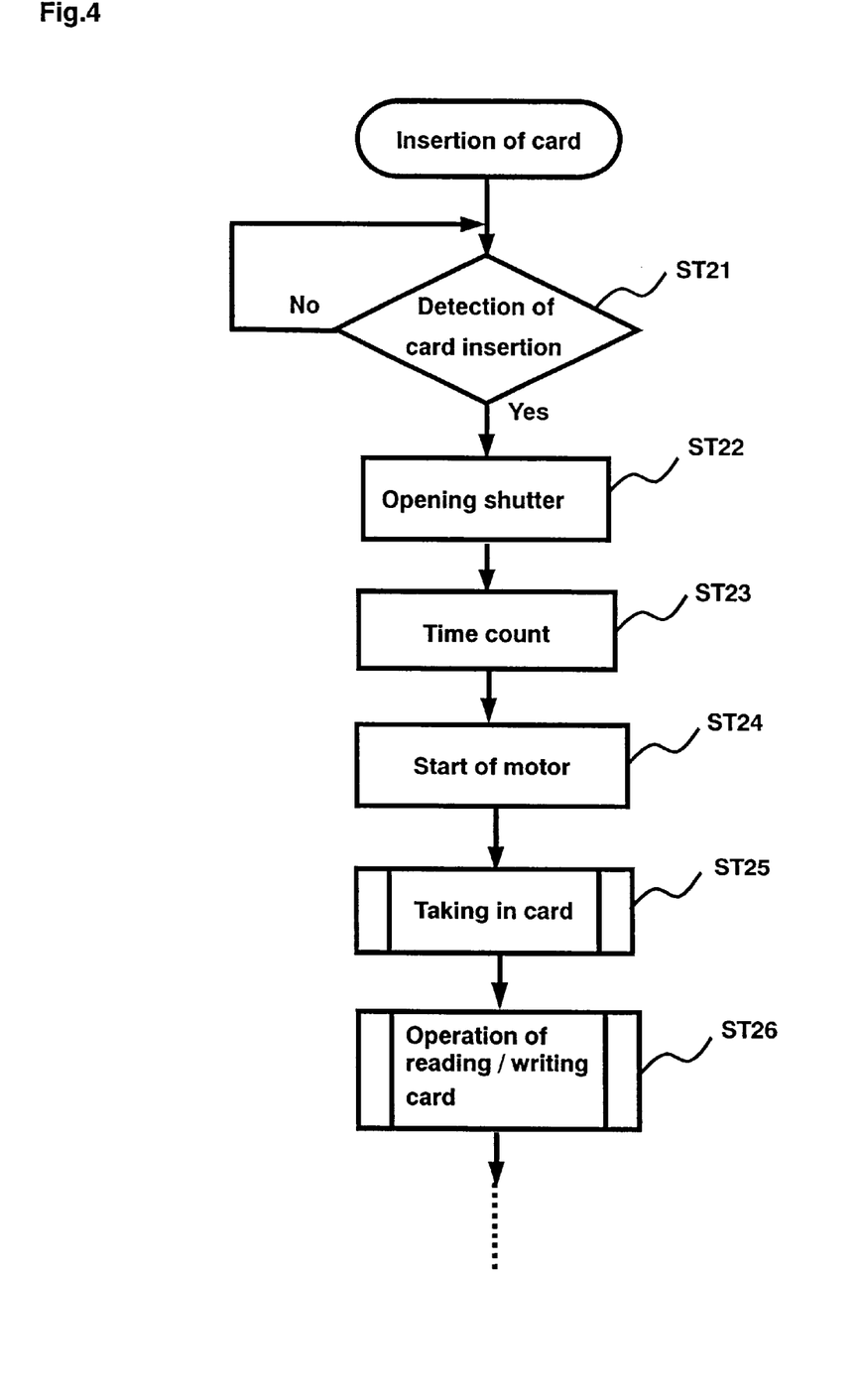
FIG. 4 is a flowchart showing another example of an operation of taking in a magnetic card in the apparatus of FIG. 1.

A second method of control is to rotate (start) motor 14 for transferring the card not at the same time of opening of shutter 9, but after a given period of time such that transferring of magnetic card 6 is temporarily suspended. In this case, as shown in FIG. 4, after shutter 9 is opened in ST22, a given period of time is counted in ST23; thereafter, motor 15 is rotated (started) in ST24. The rest of the process, ST21, ST25, ST26 are identical to ST1, ST5, ST6 of FIG. 2(a).

By delaying rotation (start) of the motor, magnetic card 6 inserted from card slot 5 is temporarily stopped while being inserted between transferring rollers 11 since rollers 11 have not started rotating. Hence, one may prevent recorded information on the magnetic card, which is inserted via the magnetic head illegally attached to the outside of card slot 5, from being read out.

A third method of control is to open shutter 9 after detecting that the end of inserted magnetic card 6 comes in contact with shutter 9 during insertion of the card.

Whether magnetic card 6 comes in contact with shutter 9 is detected by detecting a decrease in the output from magnetic head 7 for detecting insertion of a card. When card 6 comes in contact with shutter 9, the speed of the card to be inserted is lowered wherein the output from magnetic head 7 is lowered or disappears.

Also, one may mount detector 30, such as a micro switch, to detect that magnetic card 6 comes in contact with shutter 9 as indicated with an imaginary line in FIG. 1.

Figure 5:
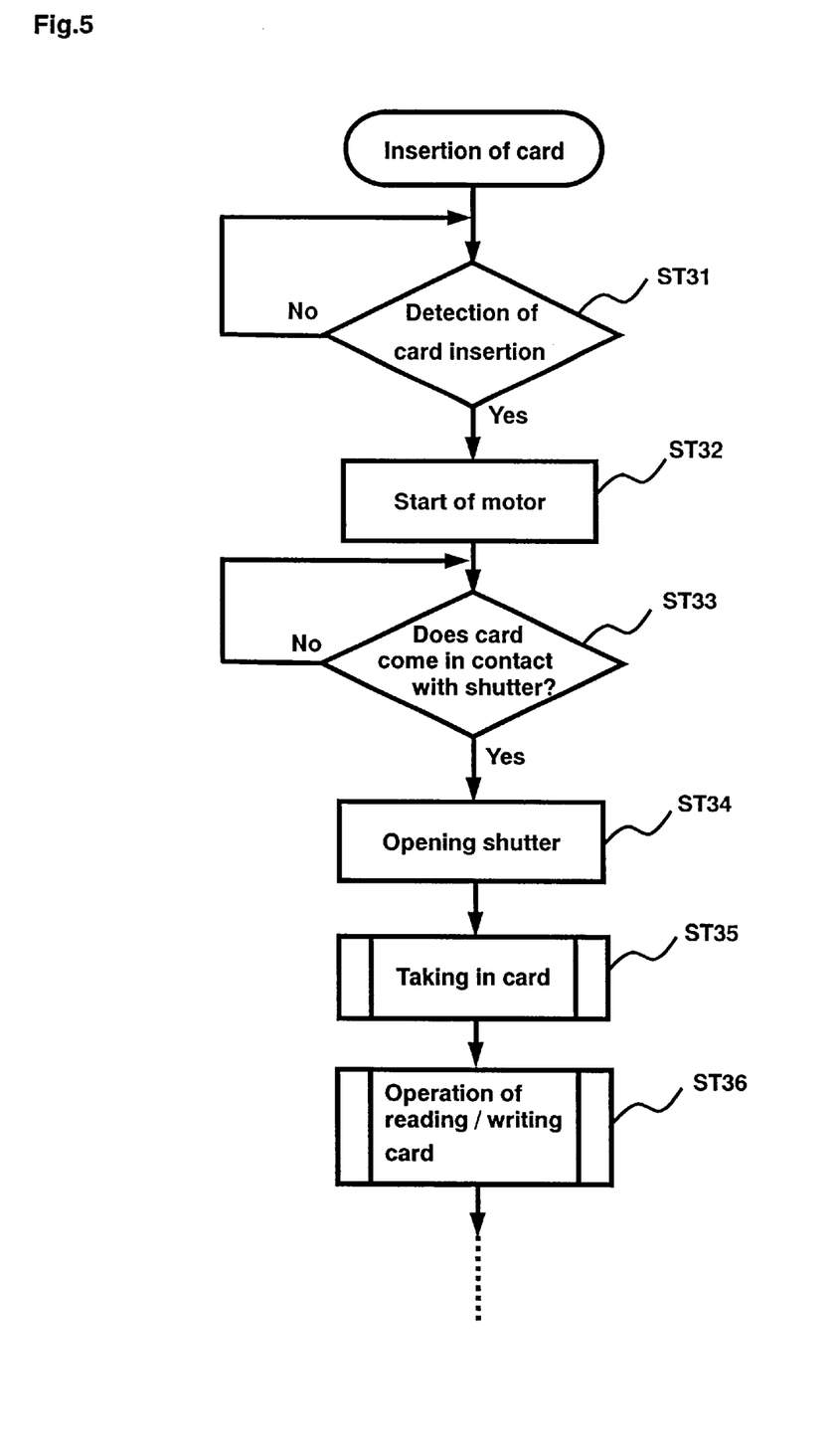
FIG. 5 is a flowchart showing yet another example of an operation of taking in a magnetic card in the apparatus of FIG. 1.

FIG. 5 shows a flowchart for operation of taking in a magnetic card in the above establishment. When insertion of magnetic card 6 is detected by magnetic head 7, motor 15 is rotated (started) (ST31, ST32). Then, the output from magnetic head 7 for detecting insertion of a card is lowered or disappears when magnetic card 6 starts to stop or completely stops while being in contact with shutter 9. By monitoring the output, whether the end of inserted magnetic card 6 comes in contact with shutter 9 can be detected. When it is in contact, the process proceeds from ST33 to ST34 wherein shutter 9 is opened. Thereafter, the user pushes in magnetic card 6 further such that the end of magnetic card 6 is held between transferring rollers 11 to start the operation of taking in of the magnetic card (ST35). Then, reading out and writing from / onto magnetic card 6 begins (ST36).

In this method of control, magnetic card 6 inserted from card slot 5 is temporary stopped when coming in contact with shutter 9. Therefore, one can prevent a magnetic head, which is illegally attached to the outside of the card slot, from reading information of the inserted magnetic card.

Other Embodiments

In the above embodiments, one can prevent an illegally attached magnetic head from reading information on a magnetic card by controlling motion of the magnetic card. One may employ the following configuration with or without the above control of card movement.

Figure 6:
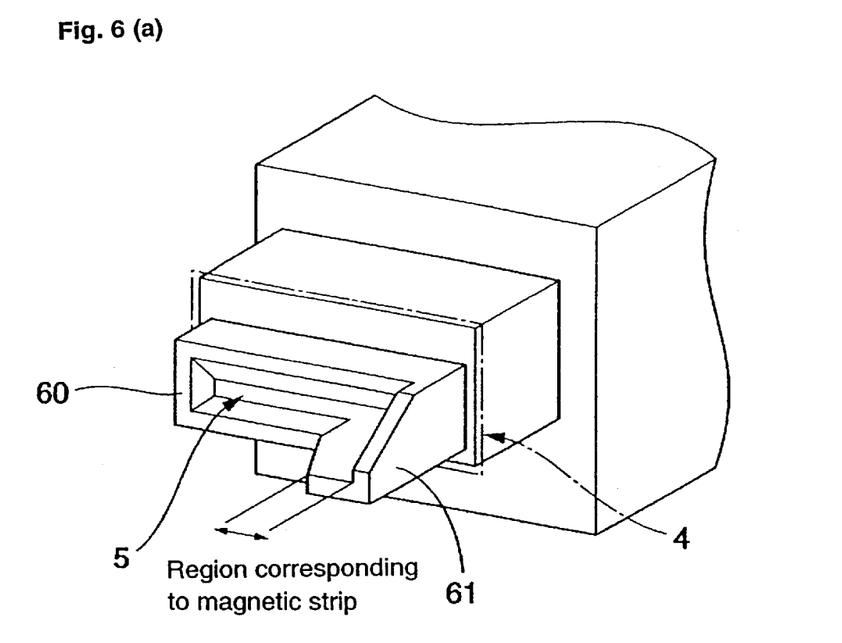
FIG. 6 is a configuration showing a modified example of the apparatus of FIG. 1.

In the first configuration, a configuration at the outside od card slot opening 4 of front panel 3 is altered such that magneic head 20 cannot be mounted threat. In this case, as shown in FIGS. 6(a) and 6(b), a part of slot frame 60, which defines card slot 5 of magnetic card reader 1, is projected from opening 4 of front panel 3. Projection 61 faces a magnetic strip of inserted magnetic card 6; it is preferable 61 on both top and bottom thereat in the case of handling a magnetic card having magnetic strips on both sides.

This configuration makes illegal mounting of a magnetic head to the outside of card slot 5 difficult or impossible. Therefore, one may prevent a magnetic head from illegal reading out of information on a magnetic card.

Figure 7:
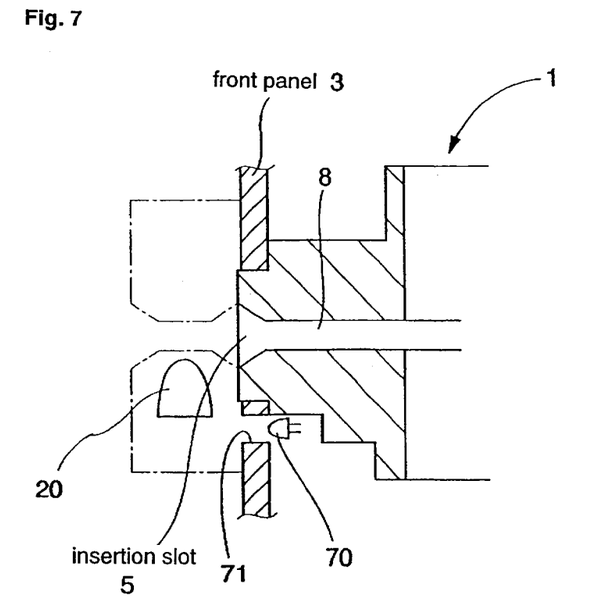
FIG. 7 is a configuration showing another modified example of the apparatus of FIG. 1.

In a second configuration, illegal reading out can be prevented by detecting whether a foreign object, such as a magnetic head, is illegally attached to card slot opening 4 of the front panel. As shown in FIG. 7, detector 70 is attached on the back side of the front panel at a position in the vicinity of card slot 5; detector 70 detects whether a foreign object, such as magnetic head 20, is illegally attached to the front surface of the front panel.

As detector 70, for example, one may employ a optical reflective sensor shown in FIG. 7; a foreign object on the front surface can be detected forming detection opening 71 on front panel 3. Instead of a reflective sensor, one may employ a microwave sensor, a metal detecting sensor, or a mechanical sensor such as a micro switch.

Figure 8:
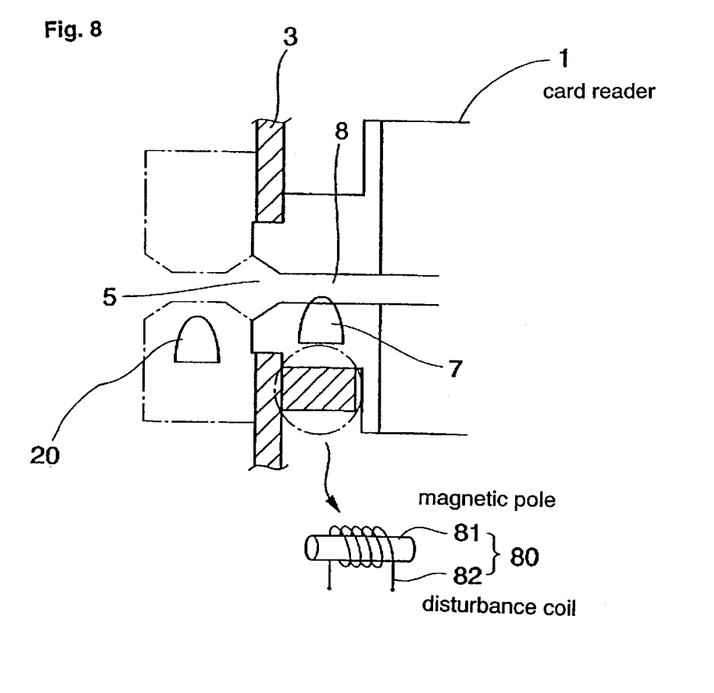
FIG. 8 is a configuration showing yet another modified example of the apparatus of FIG. 1.

In a third configuration, even though a magnetic head is illegally mounted at card slot opening 4 of front panel 3, reading of a magnetic card can be disabled by a disturbance magnetic field generator. As shown in FIG. 8, disturbance magnetic field generator 80, in which coil 82 is wound around iron core 81, is attached in the vicinity of card slot 5 to prevent magnetic head 20, illegally attached to the outside of the front panel, from reading of a magnetic card by generating a disturbance magnetic field. A current in coil 82 can be either direct or alternating.

The above describes the present invention in reference to embodiments; however, the present invention is not limited to the above embodiments. For example, in the above embodiments, the direction of transferring a magnetic card is reversed when the transferring operation is temporarily suspended. However, one may alter the card transferring speed such that it is difficult to read a magnetic strip with a magnetic head.

As described above, in a magnetic card transaction apparatus of the present invention, transferring of a magnetic card is either temporarily suspended or the direction of transferring is reversed during the operation of taking in or ejecting the card from a card slot. Therefore, one can prevent reading of a magnetic card by a magnetic head, which is illegally mounted on the outside of the card slot.

What is claimed is:

1. A magnetic card transaction apparatus for defeating an unauthorized reading of a magnetic card, the apparatus comprising:

an insertion detector which detects that a magnetic card is inserted through an insertion slot;

a card transferring system that takes in the magnetic card;

a shutter that opens or closes a card guiding path guiding the magnetic card inserted from the card slot;

a magnetic head that reads magnetic information stored in the magnetic card; and a drive control circuit that controls the shutter to open the card guiding path when the insertion detector detects that the magnetic card is inserted, the drive control circuit further operable to:

drive the card transferring system to take in the magnetic card, temporarily suspend operation of taking in the magnetic card by the card transferring system before the magnetic card reaches the magnetic head and while a portion of the magnetic card still extends out of the card slot, and after the temporary suspension, drive the card transferring system to resume operation of taking in the magnetic card past the magnetic head such that the magnetic head reads the magnetic information stored in the magnetic card.

2. The magnetic card transaction apparatus according to claim 1 wherein the card transferring system comprises a motor controlled by the drive control circuit and a plurality of rollers coupled to be driven by the motor.

3. The magnetic card transaction apparatus according to claim 1 wherein the drive control circuit is further operable to:

drive the card transferring system to eject the magnetic card, temporarily suspend operation of ejecting the magnetic card by the card transferring system after the magnetic card travels past the magnetic head and while a portion of the magnetic card extends out of the card slot, and after the temporary suspension, drive the card transferring system to resume ejection of the magnetic card.

4. The magnetic card transaction apparatus according to claim 1 wherein the drive control circuit temporarily suspends operation of taking in the magnetic card by the card transferring system for a time period between 100 ms and 500 ms, inclusive.

5. The magnetic card transaction apparatus according to claim 1 wherein the insertion detector includes a magnetic head operable to detect the presence of the magnetic medium of the magnetic card.

6. A method of defeating an illegal reading of a magnetic card at a point of insertion of the card through a card slot into a card reader having a card transferring system to move the card past a magnetic head, the method comprising:

detecting that a magnetic card is inserted through an insertion slot;

opening a card guiding path when insertion of the magnetic card is detected;

driving a card transferring system to take in the magnetic card;

temporarily suspending operation of taking in the magnetic card by the card transferring system before the magnetic card reaches a magnetic head and while a portion of the magnetic card still extends out of the card slot; and after the temporary suspension, driving the card transferring system to resume operation of taking in the magnetic card past the magnetic head such that the magnetic head reads the magnetic information stored in the magnetic card.

7. The method according to claim 6, further comprising:

driving the card transferring system to eject the magnetic card;

temporarily suspending operation of ejecting the magnetic card by the card transferring system after the magnetic card moves past the magnetic head and while a portion of the magnetic card extends out of the card slot; and after the temporary suspension, driving the card transferring system to resume ejection of the magnetic card.

8. The method according to claim 6 wherein the step of temporarily suspending operation includes suspending operation of taking in the magnetic card by the card transferring system for a time period between 100 ms and 500 ms, inclusive.

9. The method according to claim 6 wherein the step of detecting includes detecting the presence of the magnetic medium of the magnetic card.

10. A magnetic card transaction apparatus comprising:

a card slot from which a magnetic card is inserted;

a detector which detects that said magnetic card is inserted from said card slot;

a card transferring mechanism which takes in said magnetic card;

a shutter which opens or closes a card guiding path guiding said magnetic card inserted from said card slot to said card transferring mechanism; and a controller which controls said shutter to open said card guiding path when said detector detects that said magnetic card is inserted, said controller further operable to temporarily suspend said card transferring mechanism after said card guiding path is opened and before said card transferring mechanism is activated to transfter said magnetic card while a portion of the magnetic card still extends out of the card slot.

11. A magnetic card transaction apparatus comprising:

a card slot from which a magnetic card is inserted;

a card insertion detector which detects that said magnetic card is inserted from said card slot;

a card transferring mechanism which takes in said magnetic card;

a shutter which opens or closes a card guiding path guiding said magnetic card inserted from said card slot to said card transferring mechanism;

a detector which detects that said magnetic card inserted from said card slot comes in contact with said shutter; and a shutter controller which opens said guiding path by driving said shutter, said shutter controller further operable to temporarily suspend opening of said shutter after said detector detects that said magnetic card has come in contact with said shutter while a portion of the magnetic card still extends out of the card slot.

* * * * *